United States Patent
Cha et al.

(10) Patent No.: US 6,943,989 B2
(45) Date of Patent: Sep. 13, 2005

(54) SUBAMBIENT PRESSURE SLIDER WITH PARTITIONED SUBAMBIENT AREA

(75) Inventors: Ellis T. Cha, San Jose, CA (US); Hao Qing Pan, Milpitas, CA (US)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 10/165,786

(22) Filed: Jun. 7, 2002

(65) Prior Publication Data

US 2003/0227717 A1 Dec. 11, 2003

(51) Int. Cl.[7] .................................................. G11B 5/60
(52) U.S. Cl. ................................................... 360/236.2
(58) Field of Search ............................ 360/236.1–236.3, 360/236.5, 236.7–236.8, 235.5, 235.7, 235.9, 237, 236.9

(56) References Cited

U.S. PATENT DOCUMENTS

| | | | | |
|---|---|---|---|---|
| 5,276,573 A | * | 1/1994 | Harada et al. ........... 360/235.3 |
| 5,343,343 A | * | 8/1994 | Chapin ..................... 360/236.1 |
| 5,353,180 A | * | 10/1994 | Murray ..................... 360/236.1 |
| 5,567,331 A | * | 10/1996 | Kajitani ....................... 216/22 |
| 6,021,020 A | * | 2/2000 | Itoh et al. ................ 360/236.1 |
| 6,055,130 A | * | 4/2000 | Dorius et al. ............. 360/236.3 |
| 6,459,546 B1 | * | 10/2002 | Mundt et al. ............. 360/236.3 |
| 6,594,113 B2 | * | 7/2003 | Rao et al. ................ 360/235.8 |

\* cited by examiner

*Primary Examiner*—Angel Castro C
(74) *Attorney, Agent, or Firm*—Kenyon & Kenyon (57) ABSTRACT

A subambient pressure air bearing slider for disk drives and the like is presented where the subambient pressure area is divided into two or more areas. For example, a first area extending between the rails can have a depth (e.g., between 20 and 100 microinches) relative to the height of the rails, while the second area has a deeper depth (e.g., between 20 and 200 microinches). In one embodiment, the second area is placed in the outside rear quadrant relative to the rear edge of the slider and the rail closer to the outside diameter of the moving disk. By partitioning the subambient pressure area and properly selecting the depths of the partitioned areas, the slider can achieve a more uniform flying height over the range of diameters of the moving disk, at different rotational speed velocities for the disk and at different operation altitudes.

30 Claims, 8 Drawing Sheets

SUBAMBIENT PRESSURE SLIDER WITH PARTITIONED SUBAMBIENT AREA

FIELD OF THE INVENTION

The present invention is directed to air bearing slider designs in disk drives. More particularly, the present invention pertains to a multiple level surface configuration for a subambient pressure air bearing slider.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. For example, there are many advantages for reducing or having a relatively small flying height. A relatively small flying height allows the transducer to achieve greater resolution between different data bit locations and magnetic fields emanating from closely defined regions on the disk surface. Also, a low flying slider is known to provide improved high density recording or storage capacity of magnetic disks which is usually limited by the distance between the transducer and the magnetic media. Narrow separation gaps permit shorter wavelength signals to be recorded or read as a result. At the same time, with the increasing popularity of lightweight and compact notebook type computers that utilize relatively small yet powerful disk drives, the need for a progressively smaller slider body with a lower flying height has continually grown.

It has also been observed that a constant flying height provides desirable benefits which may be more readily achieved through particular ABS designs. Fluctuations in flying height are known to adversely affect the resolution and the data transfer capabilities of the accompanying transducer or read/write element. The amplitude of the signal being recorded or read does not vary as much when the flying height is relatively constant. Additionally, changes in flying height may result in unintended contact between the slider assembly and the magnetic rotating disk. Sliders are generally considered to be either direct contacting, pseudo-contacting or flying sliders which is descriptive of their intended contact with a rotating disk. Regardless of the type of slider, it is often desirable to avoid unnecessary contact with the surface of the spinning magnetic disk so as to reduce the wear on both the slider body and the disk. The deterioration or wear of the recording media may lead to the loss of recorded data, while slider wear may also result in the ultimate failure of the transducer or magnetic element.

What often causes changes to the flying height is the continual high speed movement of the slider across the rotating disk while performing read or write operations. For example, depending on the radial position of the slider, the respective linear velocity of the disk varies. Higher velocities are observed at the outer edge of the rotating disk, while lower velocities are found at the inner edge. As a result, the air bearing slider flies at different relative speeds at different radial positions relative to the disk. Because sliders typically fly higher at higher velocities, there is a tendency for flying heights to increase when positioned above the outer regions of the disk. At the same time, lower velocities at the inner regions of the disk cause the slider to fly lower. Accordingly, slider designs must account for the noticeable effect that variations in radial position, and relative velocity, have on the flying height.

The flying height of a slider is also adversely affected by changes in skew. The skew angle is defined and measured as the angle formed between the longitudinal axis of the slider body and the direction of the air flow tangential to the disk rotation. When the mounted slider is positioned near the inner or outer edges of the spinning disk, its longitudinal axis is often skewed in relation to the direction of the air flow. The longitudinal axis of the slider may be defined as a center line of reference running along the length of the slider body. These angular orientations or skew angles typically vary as a rotary actuator arm and gimbal suspension assembly turns about its pivot point thereby moving the slider in an arcuate path across the rotating disk. In view of the growing demand for compact disk drives having relatively smaller actuator arms, larger skew angles are ever more present because of the shortened arm length. It has often been observed that at skew values above zero, sliders are pressurized at reduced values which cause an undesirable decrease in flying height. Even a relatively moderate skew angle range adversely affects the flying capabilities of a slider. As a result, ABS designs continually attempt to minimize slider sensitivity to changes in skew.

Another fluctuation in flying height may be identified as slider roll. The roll angle is measured and defined by the difference in flying height between the longitudinal sides of the slider. Whenever a slider flies at skew with respect to the direction of the air flow, an unequal pressure distribution tends to occur between the ABS and the disk. This imbalance causes slider roll where one side of the slider body is closer to the disk surface than the other side. A slider, however, is preferably positioned at a constant slider roll regardless of any changes in the flying conditions including differences in tangential velocity between the inner and outer tracks of the rotating disk, and continuous lateral movement above the surface of the disk or varying skew angles.

Figure 1:
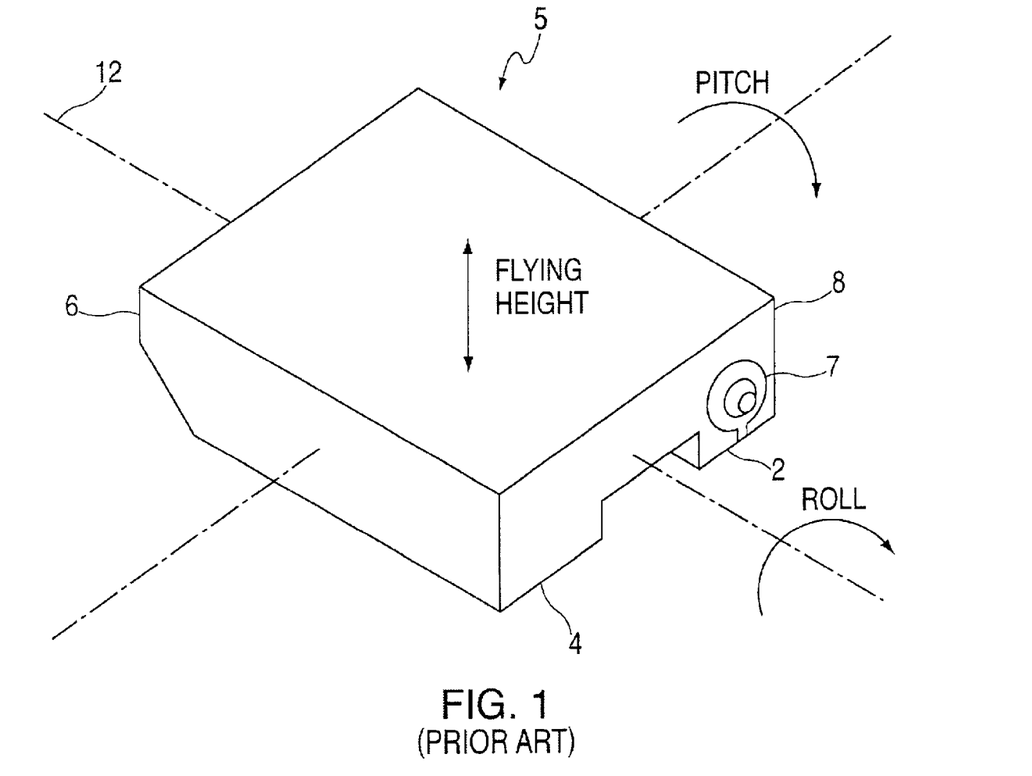
FIG. 1 is a perspective view of a flying slider with a read and write element assembly having a tapered conversational catamaran air bearing slider configuration.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

Figure 2:
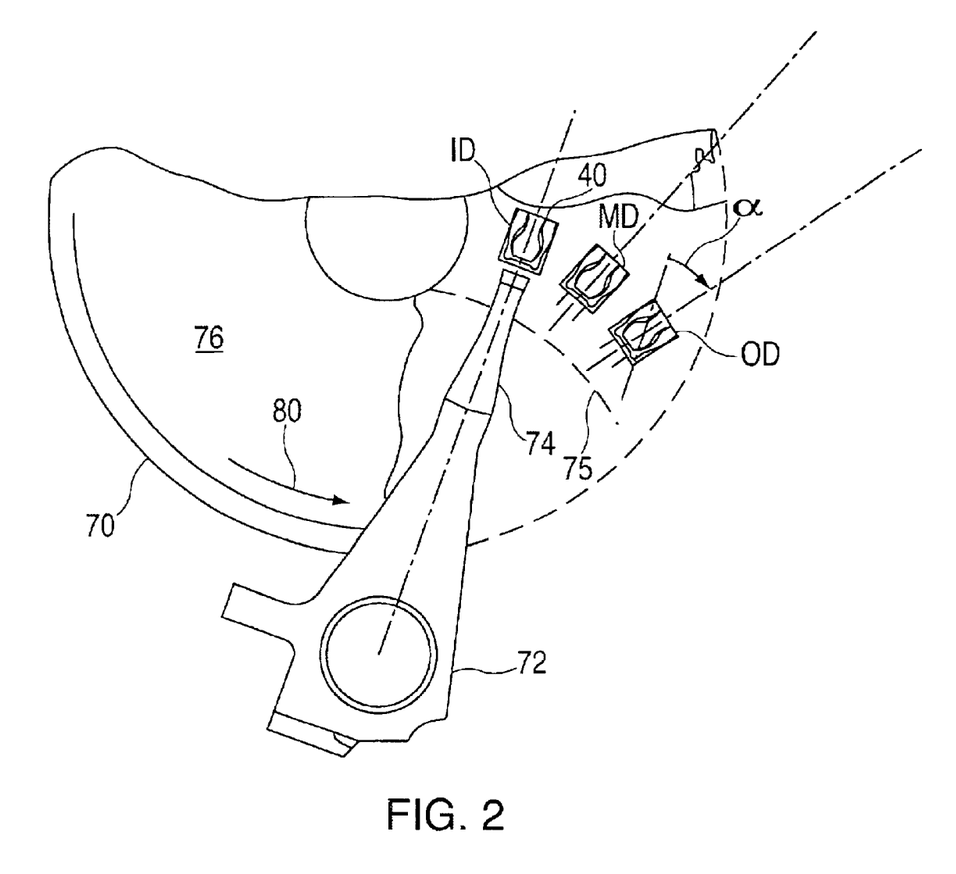
FIG. 2 is a plan view of a mounted air bearing slider in accordance with the present invention (not drawn to scale).

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 moves the HGA over various diameters of the disk 76 (e.g., inner diameter (ID), middle diameter (MD) and outer diameter (OD)) over arc 75.

Although catamaran sliders are initially effective in providing an adequate flying height, they are especially sensitive to varying skew angle ranges and other adverse flying conditions. When the skew angle is increased, such as when the flying slider moves across the rotating disk, the air pressure distribution beneath the rails may become distorted. By accessing both inner and outer portions of a disk at relatively high speed, air is introduced in an uneven amount under each rail which typically causes slider roll as depicted in FIG. 1. As a result, the slider experiences an uneven distribution of pressure which may cause the slider to roll in one direction such that the flying height is not uniform between the ABS rails. The mounted transducer may therefore be unable to operate effectively or accurately perform its data transfer operations. Regardless of the sensitivity of the ABS rails to various skew ranges and other adverse flying conditions, this rail design is widely acknowledged as a general configuration that provides effective pressurization or lift to enable a slider to fly.

In order to counteract the positive pressurization of the flying slider body to provide a low and constant flying, height, it is known to form an ABS that also provides negative or subambient pressurization to pull or draw the slider body towards the disk. For example, negative pressure air bearing (NPAB) or self loading sliders have been known to provide a counteracting negative pressure load. In this dual pressurization scheme, the ABS may be generally formed with a leading edge, a trailing edge, side rails, and a cross-rail that extends between the side rails in a basic H-shaped orientation. The cross-rail, which is often positioned closer to the leading edge than the trailing edge of the slider, creates a subambient pressure region trailing the cross-rail and in between the side-rails. The subambient pressure region creates a negative pressure or load that counteracts the positive pressure generated along the side rail portion of the ABS. This counteraction of negative and positive forces has been known to increase the stability and air bearing stiffness of the slider, provide rapid slider takeoff, and reduce its sensitivity to variations in conditions such as changing disk velocity and radial movement which cause fluctuations in flying height. The compensating changes in positive and negative pressure, in accordance with the varying velocity between the inner and outer tracks of the disk, contributes to the overall objective of maintaining a substantially constant and steady flying height. However, the offsetting forces created in a subambient pressurization scheme may often present undesirable effects that actually cause variations in flying height. A NPAB slider often exhibits noticeable roll as well, and a reduction in flying height at skewed conditions because of unequal pressurization or distribution of air beneath the rails.

Another type of ABS rail modification that has been developed is generally known as a transverse pressurization contour (TPC). A TPC may be formed on ABS rails at various locations along the edges of their air bearing surface areas. This has been observed to provide some reduction in flying height variations at skew angles in certain applications. When there is a transverse component of air flow directed across the face of the rail, the contour provided by a transverse edge of a TPC rail may experience positive pressurization while a counter balancing negative pressurization is produced in a contour along the other transverse edge of the rail. As a result, the overall pressure distribution across the ABS may remain relatively unchanged over some range of varying skew angles where the transverse component of air flow tends to cause unequal pressurization.

All of the aforementioned ABS configurations and modifications for air bearing sliders attempt to achieve a low and constant flying height. Different degrees of effectiveness are provided by these ABS designs which overall do not control flying height, or pitch and roll angles very well. For example, many existing ABS designs have been observed to exhibit an extremely increased slider roll angle over outer tracks regions of a disk. These configurations also typically fail to control the increase in slider pitch angle when moving from inner track to the outer track regions. Thus, there exists a need for an ABS configuration for an air bearing slider that effectively maintains constant flying height and controls roll angle regardless of constantly changing flying conditions such as the difference in relative velocity at the outer and inner regions of a disk, the relative positioning of a slider over a rotating disk, and varying skew angles ranges.

SUMMARY OF THE INVENTION

The present invention provides a subambient pressure air bearing slider with an air bearing surface (ABS) that provides a low and constant flying height in the presence of varying directional air flow. Also, the slider design of the present invention may provide a constant flying height a different altitudes and with different disk speeds. In one embodiment of the present invention, the subambient pressure area of the slider body is partitioned such that a first area is at a predetermined depth and the second area is at a deeper depth. In one example, the first area extends between the rails and from the leading step portion of the slider while the second area resides at the outer-rear quadrant of the slider body.

DETAILED DESCRIPTION OF THE INVENTION

Figure 3:
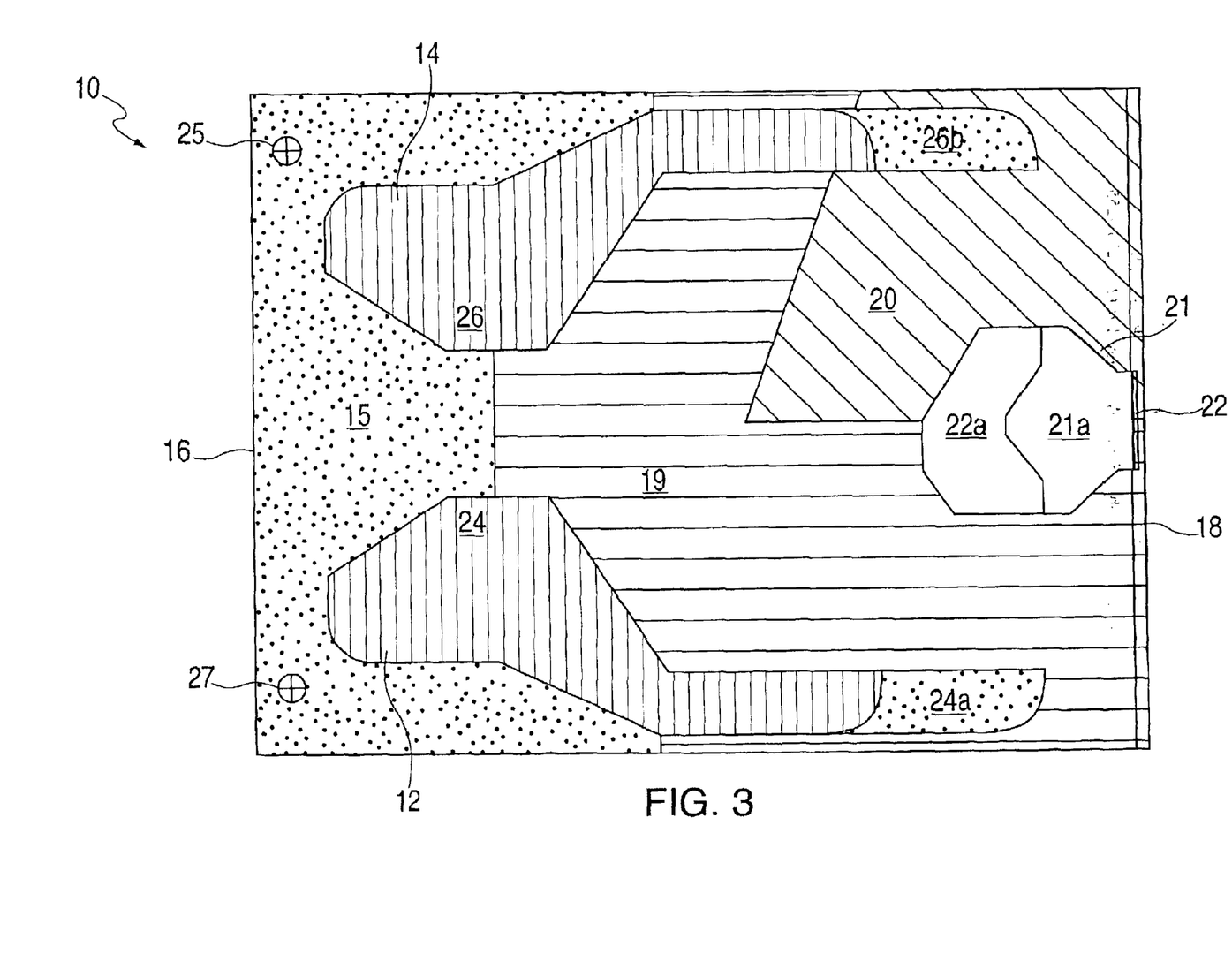
FIG. 3 is a bottom plan view of a subambient pressure slider constructed according to a an embodiment of the present invention.

FIG. 3 is a plan view of the bottom side of an ABS 10 for a subambient pressure slider in accordance with the present invention. It will be understood that for purposes of describing particular features of an ABS as follows, the entire slider body, which may be formed from a substrate material such as $Al_2O_3TiC$, is not shown. The ABS 10 illustrated in FIG. 3 includes a pair of rails 12 and 14 each having effective air bearing areas 24 and 26. The inner rail 12 and the outer rail 14 generally extend from the leading edge 16 toward the trailing edge 18 of the ABS. As shown in FIG. 3, the ABS rails 12 and 14 are shaped in a desired configuration by conventional techniques in accordance with one aspect of the present invention. Rails 12 and 14 are connected together at the leading edge 16 of the slider by a leading portion 15. In this embodiment of the present invention, the leading portion 15 extends from the leading edge of the slider between and to the outside of the rails 12 and 14. In FIG. 3, this leading portion 15 is created by etching the slider body in this area to a depth appropriate for desired flying characteristics (e.g. between 5 and 50 microinches). Alternatively, a ramp structure (as known in the art) can be used that extends from the leading edge 16 of the slider 10 to the leading portion 15.

In FIG. 3, according to an embodiment of the present invention, the sub-ambient pressure area between rails 12 and 14 is divided into a plurality of sections. In this example, the sub-ambient pressure area is divided into a first area 19 and a second area 20 behind the leading portion 15. In this embodiment, the second area can be referred to as the outer-rear quadrant of the sub-ambient pressure area because the second area is substantially a quarter of the area locate at the rear of the slider and at the outside edge of the slider body (relative to the moving disk). The first sub-ambient pressure area 19 can be formed, for example, by etching that area to a depth of between 20 and 100 microinches (e.g., 50 microinches). Preferably, the sub-ambient pressure area 19 has a depth that is deeper than the leading portion 15. In this embodiment, the second sub-ambient pressure area 20 has a depth between 20 and 200 microinches. Preferably, the second sub-ambient pressure area 20 has a depth deeper than the first sub-ambient pressure area 19. Thus, for example, with a depth of 50 microinches for area 19, the second sub-ambient pressure area 20 can have a depth of 130 microinches.

In this embodiment of the present invention, the slider 10 includes additional features. For example, the rails 12 and 14 may include a rear pad 21 that includes a magnetic read/write head 22. In this example, the rear pad has two levels, a first level 21a, which has a depth equal to the depth of the rails 24 and 26, and a second level 22a, which has a depth of between 2 and 50 microinches. The rails 24 and 26 also may include secondary structures 24a and 26a that are at a depth equal to the depth of the second level of the rear pad. Further, antistiction pads 25, 27 may be provided having a height greater than rails 12, 14. These pads would provide improved lift-off for the slider 10 and prevent damage to the rails 12, 14 when the slider 10 is close to the moving disk.

Figure 4:
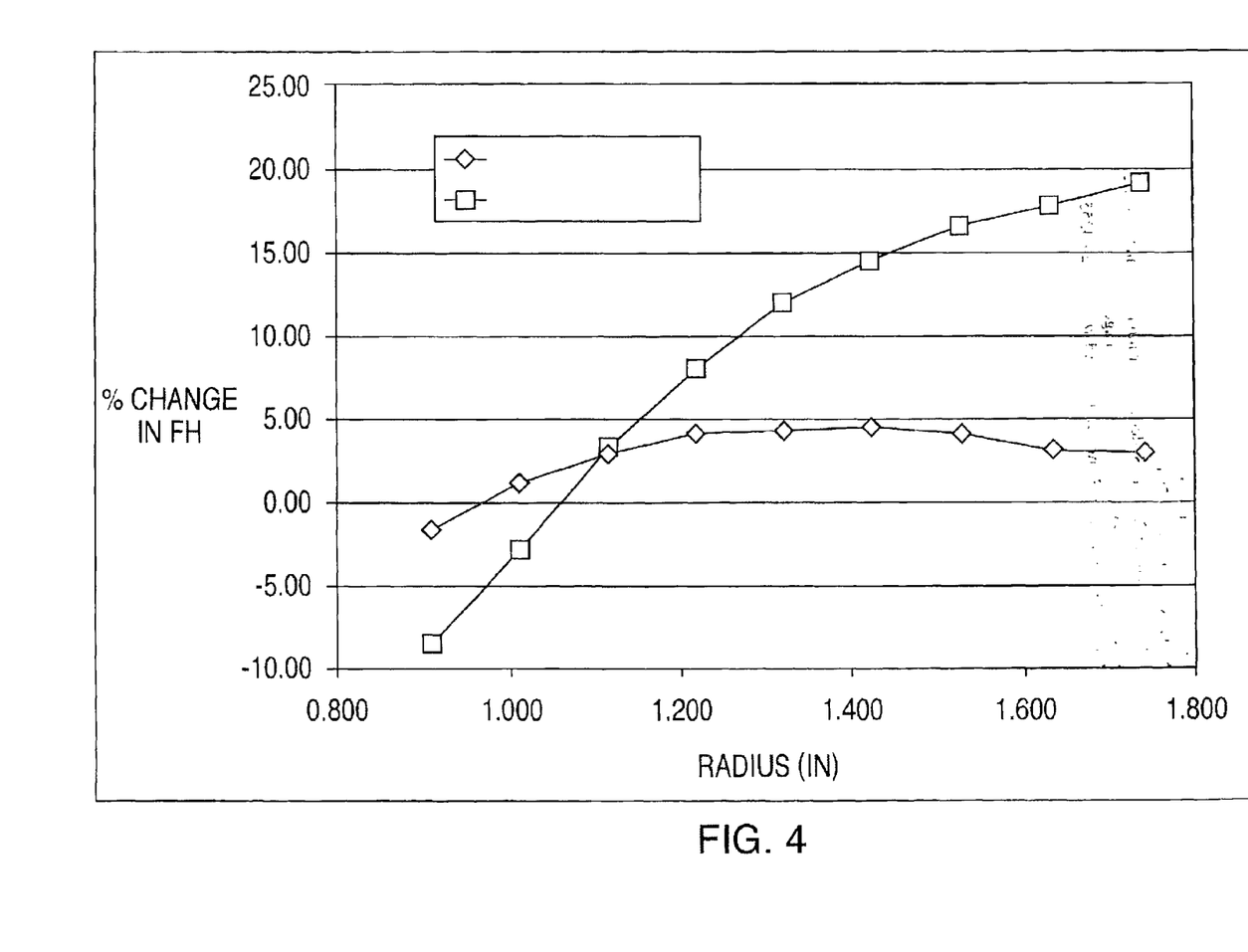
FIG. 4 is a graph of the flying height of the slider of FIG. 3 compared to one where the sub-ambient area is not partitioned.

In operation, the slider of FIG. 3 with its partitioned sub-ambient pressure area will have a flying height that is more uniform over the range of diameters of the moving disk. As known in the art, the direction of air flow and the amount of air flow changes as the slider moves between the inner diameter and outer diameter of the moving disk. In the slider of FIG. 3, air flow at the inner diameter is at an angle from the lower-left direction and air flow at the outer diameter is at an angle from the upper-left direction. At the inner diameter, the subambient pressure area provides a force urging the slider in a direction toward the moving disk. The relatively deeper sub-ambient pressure area 20 increases this attractive force for the slider than if the sub-ambient pressure area were of a uniform depth. At the outer diameter, on the other hand, the second sub-ambient area plays less of a role in providing this attractive force for the slider because of the different direction of the air flow. The result is a more even flying height for the slider. Referring to FIG. 4, a graph showing the relative flying height of the slider of FIG. 3 (with diamonds) and a slider with a uniform sub-ambient pressure area is presented (with squares). From the inner diameter to the outer diameter, the slider of FIG. 3 has less than a 5% change in flying height. With a uniform sub-ambient pressure area, the flying height of the slider can vary as much as 20% over the various diameters of the moving disk.

Figure 5:
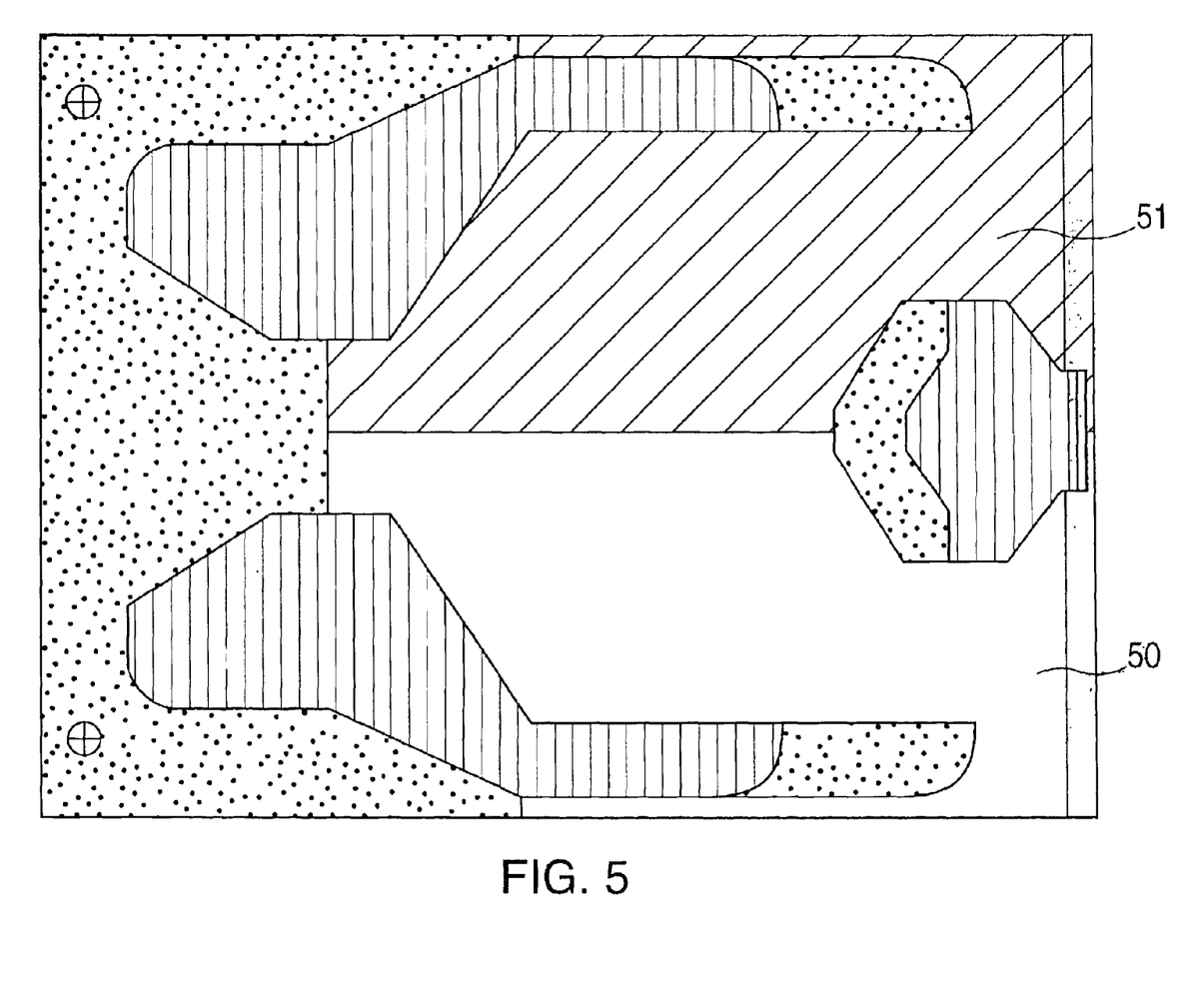
FIG. 5 is a bottom plan view of a subambient pressure slider constructed according to an alternative embodiment of the present invention.
Figure 6:
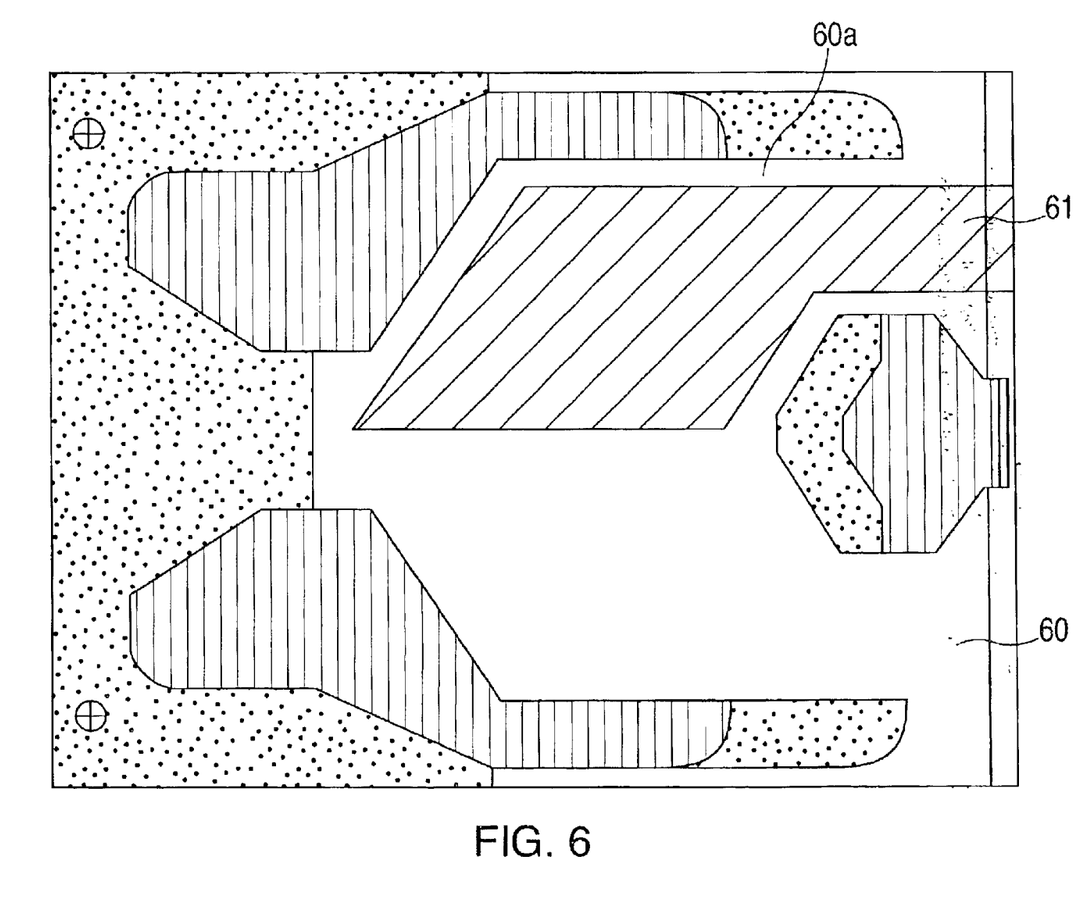
FIG. 6 is a bottom plan view of a subambient pressure slider constructed according to an alternative embodiment of the present invention.
Figure 7:
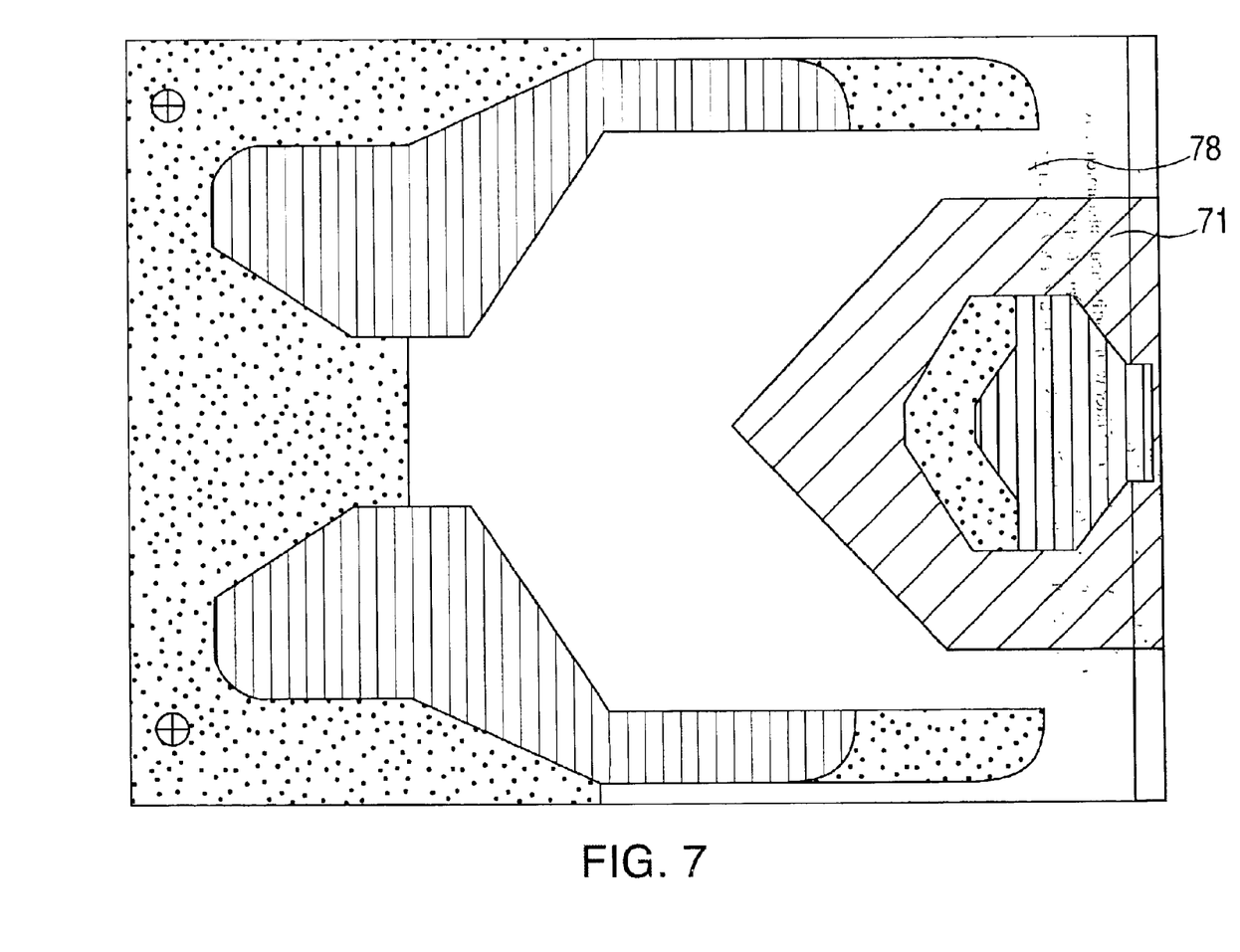
FIG. 7 is a bottom plan view of a subambient pressure slider constructed according to an alternative embodiment of the present invention.

Referring to FIGS. 5 through 8, alternative embodiments of the present invention are shown. In FIG. 5, the sub-ambient pressure area is divided into two halves. The inner half 50 of the sub-ambient pressure area has a depth equivalent to the depth of the first area in FIG. 3 and the outer half has a depth equivalent to the depth of the second area in FIG. 3. In FIG. 6, the sub-ambient pressure area is divided in much the same manner as the slider of FIG. 5. In this case the inner half 60 of the sub-ambient pressure area has a depth equivalent to the depth of the first area in FIG. 3 and the outer half 61 has a depth equivalent to the depth of the second area in FIG. 3. A difference in the embodiment of FIG. 6 is that the inner half 60 extends in a channel 60a between the outer half 61 and the outer rail. In FIG. 7, area 78 has a depth equivalent to the first area in FIG. 3, and area 71 has a depth equivalent to the depth of the second area in FIG. 3. In this embodiment area 78 extends between the rails and from the leading section of the slider, while area 71 extends in front of and to the sides of the rear pad.

Figure 8:
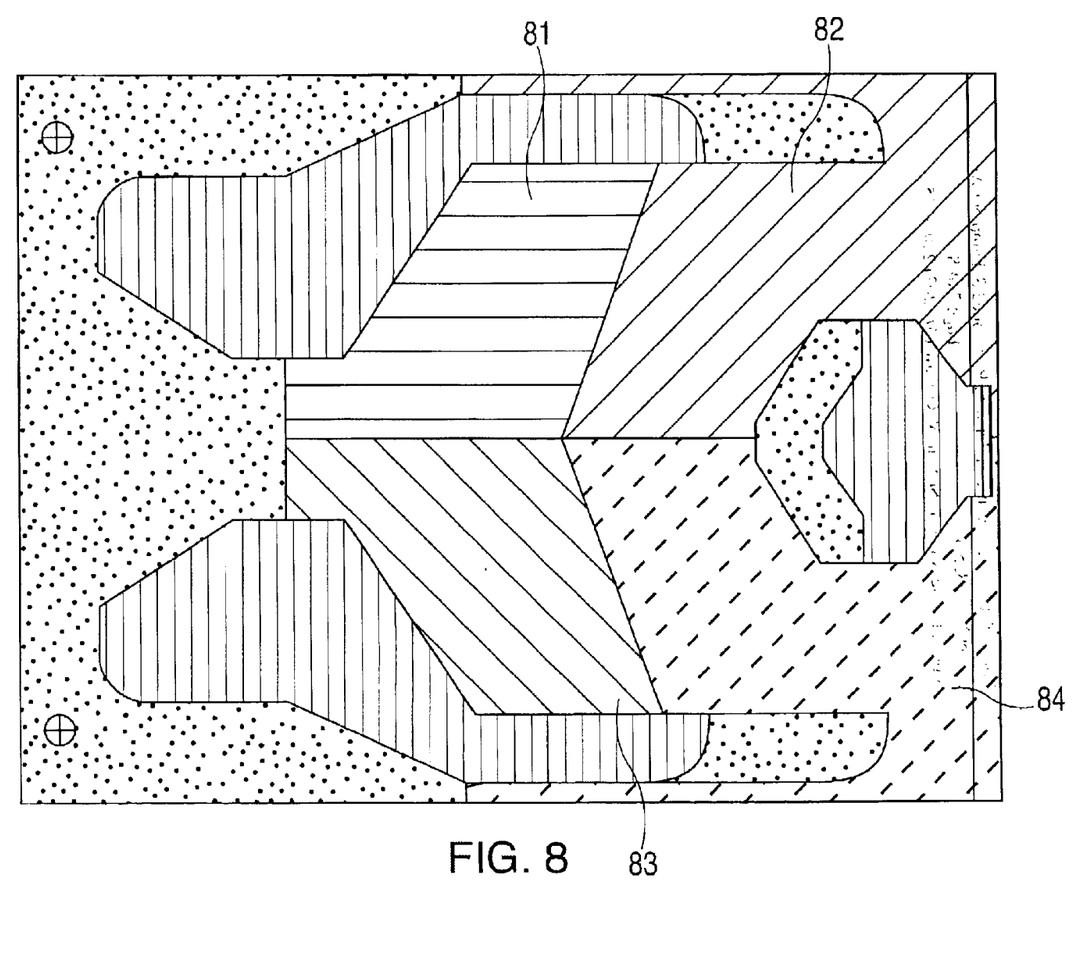
FIG. 8 is a bottom plan view of a subambient pressure slider constructed according to an alternative embodiment of the present invention.

In the embodiment of FIG. 8, the subambient pressure area is divided into four quadrants 81–84. The depths of each of these quadrants can be set depending on the conditions that exist at the inner and/or outer diameter. As an example, the depths of quadrants 81 and 83 may be set so as to set the flying height at one of the inner or outer diameter of the moving disk. Once that flying height is set, the depths of quadrants 82 and 84 may be set so as to set the flying height at the other extreme (i.e., one of the outer and inner diameter). It is desirable to set the flying height of the inner and outer diameters to be as close as possible. The actual setting of the depths may be done by manufacturing sliders with particular depths and changing them through an iterative process. Preferably, this process is performed through computer simulation (e.g, using Eq. 1 described below).

The flying height of any slider depends on a balancing of positive pressure (e.g., generating on the air-bearing rails of the slider) and negative or sub-ambient pressure (e.g., in the sub-ambient pressure area between the rails). The magnitude of the pressure generated under the slider is governed by the non-dimensional term called the bearing number, A, which can be defined as:

$$A = \frac{6\mu U L}{ph^2} \qquad \text{Eq. 1}$$

Where:
$\mu$=viscosity of air,
U=linear velocity of air,
L=characteristic length,
p=ambient pressure,
h=characteristic height.

Accordingly, from Eq. 1, changes in the velocity of air can be balanced by changing the characteristic height. This is achieved through the control of the number, shape, and depth of the partitioned areas of the sub-ambient pressure area of the slider.

One possible advantage of sliders designed as set forth above with partitioned sub-ambient pressure areas is that the slider is insensitive to air velocity. When the slider is insensitive to air velocity, the slider can "take off" from the disk in a relatively quick manner avoiding wear on the disk and slider. Another possible advantage of sliders with this design is that the same slider may be used for drives operating at different rotational speeds (e.g., 5400 and 7200 RPM) and at different altitudes.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of aerodynamic principles and variables, and may be determined, for example, through computer simulation procedures using computer simulation programs such as that developed at the Computer Mechanics Laboratory at the University of California, Berkeley, Calif. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A subambient pressure air bearing slider comprising:
    a slider body define by a leading edge, an inner and outer edge extending longitudinally along the slider body, and a rear edge, said slider body including
    an air bearing surface including at least first and second rails;
    a leading portion extending from the inner edge to the outer edge of the slider body, the leading portion extending from the leading edge of the slider to a leading portion of said first and second rails, said leading portion having a height lower than said first and second rails;
    a subambient pressure region extending between the leading portion and between the first and second rails, wherein said subambient pressure region is divided into at least first and second areas, where said first area has a first depth and said second area has a second depth, and said second depth is deeper than said first depth.

2. The slider of claim 1 wherein said first area extends from the leading portion of the slider body and between said first and second rails, and said second area is disposed exclusively in an outer-rear quadrant of said slider body.

3. The slider of claim 2 wherein said first area has a depth between 20 and 100 microinches and said second area has a depth between 20 and 200 microinches.

4. The slider of claim 1 wherein said first area extends from the leading portion of the slider body in an inside half of the subambient pressure area and the second area extends from the leading portion of the slider body in an outside half of the subambient pressure area between said first, and second rails.

5. The slider of claim 4 wherein said first area has a depth between 20 and 100 microinches and said second area has a depth between 20 and 200 microinches.

6. The slider of claim 1 wherein said second area is disposed in an outside half of the subambient pressure area and the first area extends from the leading portion of the slider in an inside half of the slider and includes a channel extending along the leading portion of the slider and between the second area and one of said first and second rails.

7. The slider of claim 6 wherein said first area has a depth between 20 and 100 microinches and said second area has a depth between 20 and 200 microinches.

8. The slider of claim 1 further comprising a rear pad disposed proximately to the rear edge of the slider, wherein said first area extends from said leading portion and between said first and second rails and said second area is disposed around said rear pad.

9. The slider of claim 8 wherein said first area has a depth between 20 and 100 microinches and said second area has a depth between 20 and 200 microinches.

10. The slider of claim 1 wherein said subambient pressure region is divided into first, second, third, an fourth regions.

11. A head gimbal assembly comprising:
    a slider including
        a slider body defined by a leading edge, an inner and outer edge extending longitudinally along the slider body, and a rear edge, said slider body including
            an air bearing surface including at least first and second rails;
            a leading portion extending from the inner edge to the outer edge of the slider body, the leading portion extending from the leading edge of the slider to a leading portion of said first and second rails, said leading portion having a height lower than said first and second rails;
            a subambient pressure region extending between the leading portion and between the first and second rails, wherein said subambient pressure region is divided into at least first and second areas, where said first area has a first depth and said second area has a second depth, and said second depth is deeper than said first depth.

12. The head gimbal assembly of claim 11 wherein for the slider said first area extends from the leading portion of the slider body and between said first and second rails, and said second area is disposed exclusively in an outer-rear quadrant of said slider body.

13. The head gimbal assembly of claim 12 wherein for the slider said first area has a depth between 20 and 100 microinches and said second area has a depth between 20 and 200 microinches.

14. The head gimbal assembly of claim 11 wherein for the slider said first area extends from the leading portion of the slider body in an inside half of the subambient pressure area and the second area extends from the leading portion of the slider body in an outside half of the subambient pressure area between said first and second rails.

15. The head gimbal assembly of claim 14 wherein for the slider said first area has a depth between 20 and 100 microinches and said second area has a depth between 20 and 200 microinches.

16. The head gimbal assembly of claim 11 wherein for the slider said second area is disposed in an outside half of the subambient pressure area and the first area extends from the leading portion o the slider in an inside half of the slider and includes a channel extending along the leading portion of the slider and between the second area and one of said first and second rails.

17. The head gimbal assembly of claim 16 wherein for the slider said first area has a depth between 20 and 100 microinches and said second area has a depth between 20 and 200 microinches.

18. The head gimbal assembly of claim 11 wherein said slider further comprises a rear pad disposed proximately to the rear edge of the slider, wherein said first area extends from said leading portion and between said first and second rails and said second area is disposed around said rear pad.

19. The head gimbal assembly of claim 18 wherein for the slider said first area has a depth between 20 and 100 microinches and said second area has a depth between 20 and 200 microinches.

20. The head gimbal assembly of claim 11 wherein for the slider said subambient pressure region is divided into first, second, third, and fourth regions.

21. A disk drive comprising:
a disk capable of rotation;
a head gimbal assembly coupled to an actuator, said head gimbal assembly including a slider, said slider including
slider body defined by a leading edge, an inner and outer edge extending longitudinally along the slider body, and a rear edge, said slider body including an air bearing surface including at least first and second rails;
a leading portion extending from the inner edge to the outer edge of the slider body, the leading portion extending from the leading edge of the slider to a leading portion of said first and second rails, said leading portion having a height lower than said first and second rails;
a subambient pressure region extending between the leading portion and between the first and second rails, wherein said subambient pressure region is divided into at least first and second areas, where said first area has a first depth and said second area has a second depth, and said second depth is deeper than said first depth.

22. The disk drive of claim 21 wherein for the slider said first area extends from the leading portion of the slider body and between said first and second rails, and said second area is disposed exclusively in an outer-rear quadrant of said slider body.

23. The disk drive of claim 22 wherein for the slider said first area has a depth between 20 and 100 microinches and said second area has a depth between 20 and 200 microinches.

24. The disk drive of claim 21 wherein for the slider said first area extends from the leading portion of the slider body in an inside half of the subambient pressure area and the second area extends from the leading portion of the slider body in an outside half of the subambient pressure area between said first and second rails.

25. The disk drive of claim 24 wherein for the slider said first area has a depth between 20 and 100 microinches and said second area has a depth between 20 and 200 microinches.

26. The disk drive of claim 21 wherein for the slider said second area is disposed in an outside half of the subambient pressure area and the first area extends from the leading portion of the slider in an inside half of the slider and includes a channel extending along the leading portion of the slider and between the second area and one of said first and second rails.

27. The disk drive of claim 26 wherein for the slider said first area has a depth between 20 and 100 microinches and said second area has a depth between 20 and 200 microinches.

28. The disk drive of claim 21 wherein said slider further comprises a rear pad disposed proximately to the rear edge of the slider, wherein said first area extends from said leading portion and between said first and second rails and said second area is disposed around said rear pad.

29. The disk drive of claim 28 wherein for the slider said first area has a depth between 20 and 100 microinches and said second area has a depth between 20 and 200 microinches.

30. The disk drive of claim 21 wherein for the slider said subambient pressure region is divided into first second, third, and fourth regions.

* * * * *

UNITED STATES PATENT AND TRADEMARK OFFICE
CERTIFICATE OF CORRECTION

PATENT NO. : 6,943,989 B2 Page 1 of 1
APPLICATION NO. : 10/165786
DATED : September 13, 2005
INVENTOR(S) : Ellis T. Cha et al.

It is certified that error appears in the above-identified patent and that said Letters Patent is hereby corrected as shown below:

Column 5, line 4, "conversational"
    should be -- conventional --;

Column 5, line 9, "to a an"
    should be -- to an --;

Column 8, line 51, "an"
    should be -- and --;

Column 9, line 28, "o"
    should be -- of --.

Signed and Sealed this

Eighteenth Day of September, 2007

JON W. DUDAS
*Director of the United States Patent and Trademark Office*